Dec. 2, 1958 R. U. BLASER ET AL 2,862,479
VAPOR GENERATING UNIT
Filed April 6, 1956 2 Sheets-Sheet 1

INVENTORS
Robert U. Blaser
BY Donald C. Schluderberg

ATTORNEY

Dec. 2, 1958   R. U. BLASER ET AL   2,862,479
VAPOR GENERATING UNIT
Filed April 6, 1956   2 Sheets-Sheet 2
FIG. 2
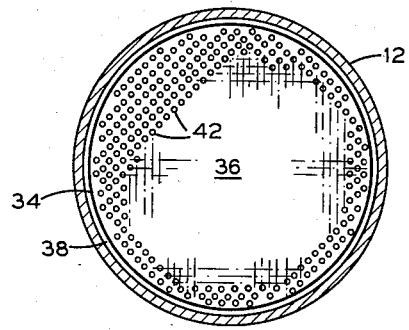
FIG. 3
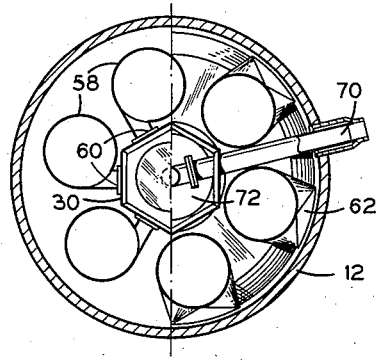
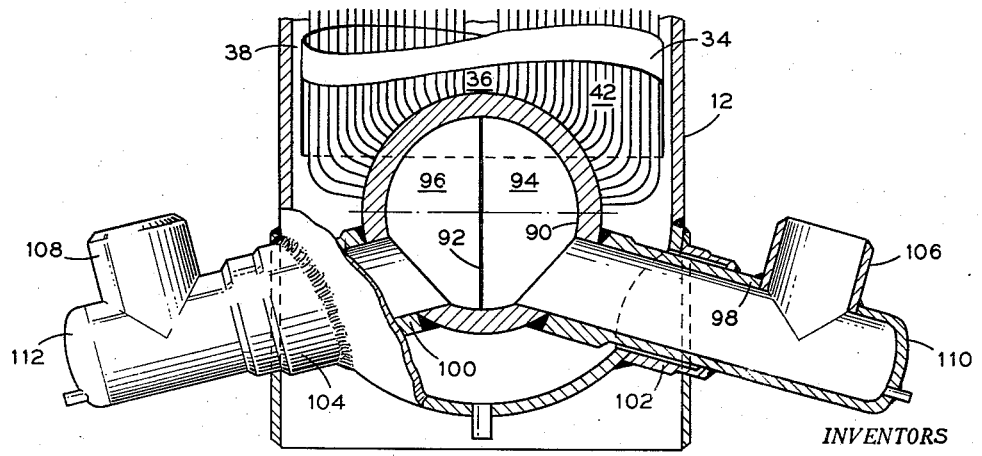
FIG. 4
INVENTORS
Robert U. Blaser
BY Donald C. Schluderberg
ATTORNEY United States Patent Office 2,862,479
Patented Dec. 2, 1958

2,862,479

VAPOR GENERATING UNIT

Robert U. Blaser, Alliance, Ohio, and Donald C. Schluderberg, Lynchburg, Va., assignors to The Babcock & Wilcox Company, New York, N. Y., a corporation of New Jersey Application April 6, 1956, Serial No. 576,729

18 Claims. (Cl. 122—34)

This invention relates in general to a vapor generating unit, and more particularly, it relates to a shell and tube type vapor generating unit in which the heat is supplied by a hot fluid flowing within the tubes. In modern day industries, such as petroleum refining, chemical manufacture and atomic energy, there are available high temperature fluids from which heat may be extracted for useful purposes to improve the economy of a particular industrial operation. A most useful method of extraction is to generate steam.

The present invention is directed to a steam generating unit which is applicable to such processes for extracting heat from the hot fluids. The vapor generating unit is specifically arranged to occupy a minimum space while transferring large quantities of heat. The unit is contained within a vertically elongated pressure vessel of circular cross section and consists of a hot liquid heated tube bundle disposed in the lower portion of the vessel within a circular baffle which forms an interior vapor generating chamber and an annular shaped downcomer bounded by the baffle and the vertical wall of the pressure vessel. At the uppermost portion of the vapor generating chamber there is a vapor-liquid collection chamber above the tube bundle. Separating means is arranged to receive and separate the vapor-liquid mixture from the vapor-liquid collection chamber. The separated steam passes into the uppermost portion of the steam generating unit pressure vessel and thence on to a point of use while the separated liquid is directed into the annular downcomer external of the tube bundle. The separated liquid after passing down the downcomer is directed into the lowermost portion of the vapor generation chamber whence it passes upwardly therethrough while vapor is generated from the heat extracted from the hot liquid flowing within the tubes of the bundle.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Of the drawings:

Fig. 2 is a transverse section taken along the line 2—2 of Fig. 1;

Fig. 3 is a transverse section of the unit taken along the line 3—3 of Fig. 1;

Fig. 4 is an alternative arrangement of the hot fluid inlet and outlet chamber when applied to the vapor generating unit of Fig. 1.

Figure 1:
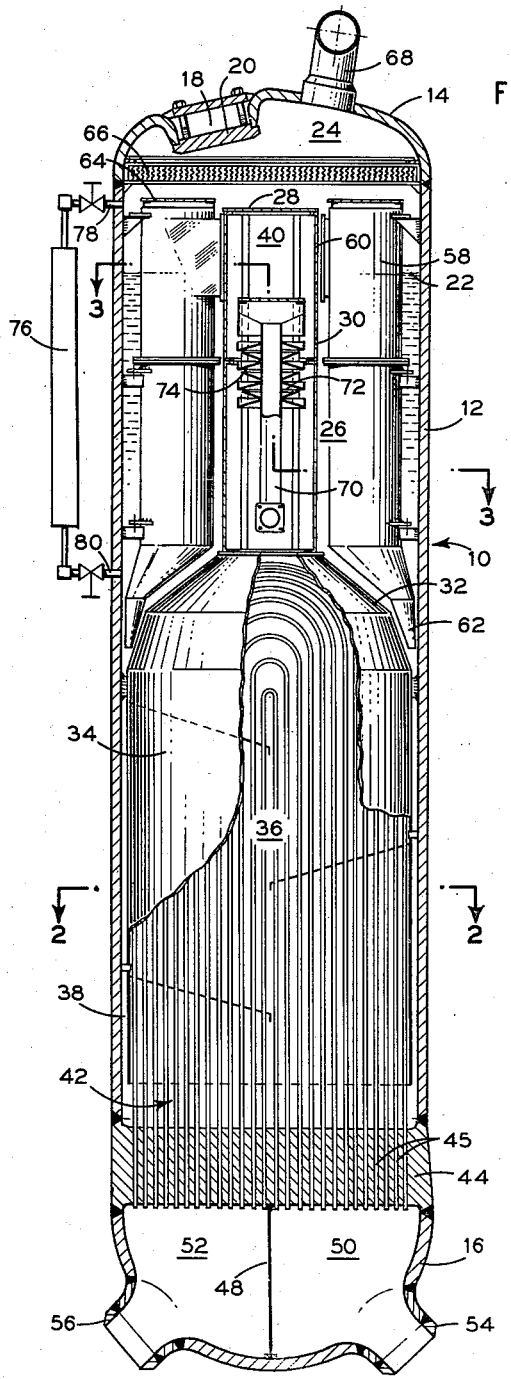
Fig. 1 is a vertical side section of the preferred embodiment of the vapor generating unit.

The vapor generating unit 10 has a vertically elongated pressure vessel 12 having a lower hemispherical head 16 closing the ends thereof and a dished head 14 arranged with a manhole opening 18 normally closed by a cover 20. During normal operation of the vapor generating unit there is a normal liquid level 22 which forms an upper vapor space 24 and a liquid space 26. Plate means including plates 28, 30, 32 and 34 in conjunction with the walls of the pressure vessel 12 coact to form a vapor generation chamber 36 and an annular downcomer 38. The vapor generation chamber 36 is vertically elongated and of a circular cross section being less than the cross section of the pressure vessel. The baffle plate 34 is joined to the plate 32 so that the upper portion of the vapor generating chamber is essentially hemispherical. Extending upwardly from the upper portion, the hexagonal cap plate 28 and the plate 30 form an extension chamber 40 shaped as a six sided regular prism for the collection of a vapor-liquid mixture.

Within the vapor generation chamber 36 there is disposed a multiplicity of U-shaped tubes constituting a vertically elongated tube bundle 42 filling the lower portion of the vapor generation chamber. A tube sheet 44 is located transversely of the longitudinal centerline of the pressure vessel 12 and has a multiplicity of tube seats 45 formed therein. Tube ends of the U-shaped tubes of the tube bundle 42 pass through the tube sheet 44 and are fastened in the tube seats for the flow of a hot heating fluid therethrough. The hemispherical head 16 is fastened to the outer edge of the tube sheet to enclose the outer face and form in conjunction with a dividing baffle 48 a hot fluid inlet chamber 50 and an outlet chamber 52. Inlet and outlet nozzles 54 and 56 provide the means for passing the hot fluid into the inlet chamber 50, through the tubes of the tube bundle 42 and out through the outlet chamber 52 to the outlet nozzle 56, whereby the fluid is cooled.

Six hollow upright whirl chamber type vapor-liquid separators 58 are arranged in a ring in the upper portion of the pressure vessel to receive a vapor-liquid mixture which is emitting radially outward from the outlets 60 of the vapor-liquid collection chamber 40. Each of the separators are arranged as described in copending application Serial No. 535,933 filed September 22, 1955 and belonging to a common assignee. Accordingly, each of the separators has an upper whirl chamber portion and a lower downflow portion with a length to diameter ratio of approximately 6 to 1 and with the whirl chamber portion being less than half of the total length. The whirl chambers 58 are arranged so that the normal liquid level 22 is positioned at the upper one third of the height of the separator. Further, each separator has an outwardly directing extension piece 62 at the liquid discharge end which is arranged to direct the separated liquid into the downcomer 38 exterior of the tube bundle 42.

Separated vapor passes out the upper end 64 of the vapor-liquid separators, through a corrugated type steam scrubbing element 66 and thence through the vapor outlets 68 to a point of use.

The makeup feed vaporizable liquid for the unit enters by the inlet pipe 70 and is discharged into the vapor-liquid collection chamber 40 via a direct contact heating arrangement 72. This contact heating arrangement is provided with a plurality of alternately inclined perforated trays 74 so that in extreme periods of operation where the chamber 40 may be largely filled by vapor the feed liquid entering will be heated to a point near saturation by the condensation of this vapor before passing into the vapor-liquid separators 58.

A water level indicating device 76 is arranged with taps 78, 80 through the side of the vessel, to visually indicate the position of the liquid level within the unit during its operation.

Fig. 4 is an alternate embodiment of the hot fluid inlet and outlet arrangement for the vapor generating unit of Fig. 1. In place of the flat tube sheet 44 there is a hemispherical shaped tube sheet 90 having a multiplicity of tube seats located therein. Further, the tube sheet 90 is divided internally by baffle 92 into an inlet chamber 94 and an outlet chamber 96. The U-shaped tubes of the tube bundle 42 have their end fastened into the hemispherical tube sheet. There is an inlet tube 98 to the inlet chamber 94 and a similarly constructed outlet tube 100 from the outlet chamber 96. These tubes pass through thermal sleeve connections 102 and 104 of the pressure vessel 12. The hot fluid circuit connections 106 and 108 are located in the side of the inlet tubes so that the end covers 110 and 112 may be removed for access to the interior of the tube sheet 90. This access is required for construction of and repairs to the tube connections. The spherically shaped tube seat is located in the lowermost portion of the vapor generating unit and is surrounded by the vaporizable liquid which passes down the downcomer 38 and thence up through the vapor generation chamber 36.

During operation of the unit a hot fluid, such as petroleum, liquid metal, water or gas flows through the tubes of the tube bundle 42 wherein it gives up heat before passing out through the outlets. The vaporizable liquid within the pressure vessel fills the liquid space 26 and the downcomer 38 and due to the thermal siphonic effect of the heat being transferred by the hot fluid within the tubes, the vaporizable liquid passes up through the tube bundle 42 within the steam generation chamber 36. As the liquid passes up therethrough, vapor is generated and the resulting vapor-liquid mixture is collected in the collection chamber 40 where it is mixed with incoming feed liquid from the feed pipe 70. The vapor-liquid mixture then passes radially outwardly into the whirl chamber separators 58. The separated vapor passes onto the vapor outlet 68 while the separated liquid passes out the outwardly directing means 62 into the annular downcomer 38. Thus there is a physical arrangement which provides for the positive and natural circulation of a vaporizable fluid within the steam generator within a defined flow path.

This specific arrangement of a vapor generator provides both an annular downcomer and an annular arrangement of vapor separating units, thus resulting in a minimum of fluid pressure drop with a resultant improvement in the circulation of the vapor generating unit. Additionally, the annular downcomer provides a more advantageous cooling arrangement of the pressure vessel shell.

The provision of the long separators in the upper portion of the vapor generating unit allows a wide latitude of liquid level variation without interfering or stopping the thermal siphonic circulation.

While in accordance with the provisions of the statutes, we have illustrated and described herein a specific form of the invention now known to us, those skilled in the art will understand that changes may be made in the form of the apparatus disclosed without departing from the spirit of the invention covered by our claims, and that certain features of the invention may sometimes be used to advantage without a corresponding use of the other features.

We claim:

1. A vapor generating unit comprising wall means forming a vertically elongated pressure vessel of circular cross section arranged to operate with an upper vapor space above a body of liquid therein, a vapor outlet from said vapor space, plate means coacting with said pressure vessel wall means to form an interior vertically elongated vapor generation chamber and an annular shaped downcomer passage exterior of said chamber within the lower portion of said vessel, said plate means extending downwardly to substantially the bottom of said vapor generation chamber, said downcomer arranged for the downward flow of liquid from said body of liquid to supply said vapor generation chamber, vapor-liquid separating means arranged to separate a vapor-liquid mixture received from said vapor generation chamber said separator arranged to discharge separated liquid to said body of liquid and vapor to said vapor space, a plurality of tubes constituting a vertically elongated bundle arranged to substantially fill said vapor generation chamber, and means for passing a heating fluid through the tubes of said bundle.

2. A vapor generating unit comprising wall means forming a vertically elongated pressure vessel of circular cross section arranged to operate with an upper vapor space above a body of liquid therein, a vapor outlet from said vapor space, plate means coacting with said pressure vessel wall means to form an interior vertically elongated vapor generation chamber and an annular shaped downcomer passage exterior of said chamber within the lower portion of said vessel, said plate means extending downwardly to substantially the bottom of said vapor generation chamber, said downcomer arranged for the downward flow of liquid from said body of liquid to supply said vapor generation chamber, said vapor generation chamber including a vapor-liquid collection chamber disposed at its uppermost portion above the tube bundle, vapor-liquid separating means arranged to separate a vapor-liquid mixture received from said vapor generation chamber said separator arranged to discharge separated liquid to said body of liquid and vapor to said vapor space, a plurality of tubes constituting a vertically elongated bundle arranged to substantially fill said vapor generation chamber, and means for passing a heating fluid through the tubes of said bundle.

3. A vapor generating unit comprising wall means forming a vertically elongated pressure vessel of circular cross section arranged to operate with an upper vapor space above a body of liquid therein, a vapor outlet from said vapor space, plate means coacting with said pressure vessel wall means to form an interior vertically elongated vapor generation chamber and an annular shaped downcomer passage exterior of said chamber within the lower portion of said vessel, said plate means extending downwardly to substantially the bottom of said vapor generation chamber, said downcomer arranged for the downward flow of liquid from said body of liquid to supply said vapor generation chamber, said vapor generation chamber including a vapor-liquid collection chamber disposed at its uppermost portion above the tube bundle along the longitudinal axis of said vessel, vapor-liquid separating means arranged to separate a vapor-liquid mixture received from said vapor generation chamber said separator arranged to discharge separated liquid to said body of liquid and vapor to said vapor space, a plurality of tubes constituting a vertically elongated bundle arranged to substantially fill said vapor generation chamber and means for passing a heating fluid through the tubes of said bundle.

4. A vapor generating unit comprising wall means forming a vertically elongated pressure vessel of circular cross section arranged to operate with an upper vapor space above a body of liquid therein, a vapor outlet from said vapor space, plate means coacting with said pressure vessel wall means to form an interior vertically elongated vapor generation chamber and an annular shaped downcomer passage exterior of said chamber within the lower portion of said vessel, said plate means extending downwardly to substantially the bottom of said vapor generation chamber, said downcomer arranged for the downward flow of liquid from said body of liquid to supply said vapor generation chamber, said vapor generation chamber including a vapor-liquid collection chamber disposed at its uppermost portion above the tube bundle along the longitudinal axis of said vessel and extending into said vapor space, vapor-liquid separating means arranged to separate a vapor-liquid mixture received from said vapor generation chamber, said separator arranged to discharge separated liquid to said body of liquid and vapor to said vapor space, a plurality of tubes constituting a vertically elongated bundle arranged to substantially fill said vapor generation chamber, and means for passing a heating fluid through the tubes of said bundle.

5. A vapor generating unit comprising wall means forming a vertically elongated pressure vessel of circular cross section arranged to operate with an upper vapor space above a body of liquid therein, a vapor outlet from said vapor space, plate means coacting with said pressure vessel wall means to form an interior vertically elongated vapor generation chamber and an annular shaped downcomer passage exterior of said chamber within the lower portion of said vessel, said plate means extending downwardly to substantially the bottom of said vapor generation chamber, said downcomer arranged for the downward flow of liquid from said body of liquid to supply said vapor generation chamber, said vapor generation chamber including a vapor-liquid collection chamber disposed at its uppermost portion above the tube bundle, vapor-liquid separating means arranged to receive a vapor-liquid mixture from said vapor-liquid collection chamber, said separator arranged to discharge separated liquid to said body of liquid and vapor to said vapor space, a plurality of tubes constituting a vertically elongated bundle arranged to substantially fill said vapor generation chamber, and means for passing a heating fluid through the tubes of said bundle.

6. A vapor generating unit comprising wall means forming a vertically elongated pressure vessel of circular cross section arranged to operate with an upper vapor space above a body of liquid therein, a vapor outlet from said vapor space, plate means coacting with said pressure vessel wall means to form an interior vertically elongated vapor generation chamber and an annular shaped downcomer passage exterior of said chamber within the lower portion of said vessel, said plate means extending downwardly to substantially the bottom of said vapor generation chamber, said downcomer arranged for the downward flow of liquid from said body of liquid to supply said vapor generation chamber, said vapor generation chamber including a vapor-liquid collection chamber disposed at its uppermost portion above the tube bundle, a plurality of tubes constituting a vertically elongated bundle arranged to substantially fill said vapor generation chamber, means for passing a heating fluid through the tubes of said bundle, vapor-liquid separating means arranged to receive a vapor-liquid mixture from said vapor-liquid collection chamber said separator arranged to discharge separated liquid to said body of liquid and vapor to said vapor space, and corrugated vapor scrubbing elements arranged between the outlet of said separators and said vapor outlet.

7. A vapor generating unit comprising wall means forming a vertically elongated pressure vessel of circular cross section arranged to operate with an upper vapor space above a body of liquid therein, a vapor outlet from said vapor space, plate means coacting with said pressure vessel wall means to form an interior vertically elongated vapor generation chamber and an annular shaped downcomer passage exterior of said chamber within the lower portion of said vessel, said plate means extending downwardly to substantially the bottom of said vapor generation chamber, said downcomer arranged for the downward flow of liquid from said body of liquid to supply said vapor generation chamber, said vapor generation chamber including a vapor-liquid collection chamber disposed at its uppermost portion above the tube bundle, a plurality of tubes constituting a vertically elongated bundle arranged to substantially fill said vapor generation chamber, means for passing a heating fluid through the tubes of said bundle, a plurality of vapor-liquid outlets in said plate means for the discharge of a vapor-liquid mixture outward from said vapor-liquid collection chamber, a ring of vertically elongated whirl chamber type vapor-liquid separators each arranged to receive a vapor-liquid mixture from one of said vapor-liquid outlets, said separators each arranged to discharge separated vapor to said vapor space and separated liquid to said downcomer and further arranged with said normal liquid level positioned at the upper one third of the height of each separator, and said separators each having a liquid discharge portion arranged to direct liquid into the annular downcomer below the top of and exterially of the tube bundle.

8. A vapor generating unit comprising wall means forming a vertically elongated pressure vessel of circular cross section arranged to operate with an upper vapor space above a body of liquid therein, a vapor outlet from said vapor space, plate means coacting with said pressure vessel wall means to form an interior vertically elongated vapor generation chamber and an annular shaped downcomer passage exterior of said chamber within the lower portion of said vessel, said plate means extending downwardly to substantially the bottom of said vapor generation chamber, said downcomer arranged for the downward flow of liquid from said body of liquid to supply said vapor generation chamber, said vapor generation chamber including a vapor-liquid collection chamber disposed at its uppermost portion above the tube bundle, a plurality of tubes constituting a vertically elongated bundle arranged to substantially fill said vapor generation chamber, means for passing a heating fluid through the tubes of said bundle, a plurality of vapor-liquid outlets in said plate means for the discharge of a vapor-liquid mixture outward from said vapor-liquid collection chamber, a ring of vertically elongated whirl chamber type vapor-liquid separators each arranged to receive a vapor-liquid mixture from one of said vapor-liquid outlets, said separators each arranged to discharge separated vapor to said vapor space and separated liquid to said downcomer and further arranged with said normal liquid level positioned at the upper one third of the height of each separator, said separators each having a liquid discharge portion arranged to direct liquid into the annular downcomer below the top of and exterially of the tube bundle, a feed liquid inlet means arranged to discharge feed liquid along the longitudinal axis of said vessel within said vapor-liquid collection chamber, and corrugated vapor scrubbing elements arranged between the outlets of said separators and said vapor outlet.

9. A vapor generating unit comprising wall means forming a vertically elongated pressure vessel of circular cross section arranged to operate with an upper vapor space above a body of liquid therein, a vapor outlet from said vapor space, plate means coacting with said pressure vessel wall means to form an interior vertically elongated vapor generation chamber and an annular shaped downcomer passage exterior of said chamber within the lower portion of said vessel, said plate means extending downwardly to substantially the bottom of said vapor generation chamber, said downcomer arranged for the downward flow of liquid from said body of liquid to supply said vapor generation chamber, said vapor generation chamber including a vapor-liquid collection chamber disposed at its uppermost portion above the tube bundle, a plurality of tubes constituting a vertically elongated bundle arranged to substantially fill said vapor generation chamber, said tubes being U-shaped and having the bends at the uppermost end of the bundle, means for passing a heating fluid through the tubes of said bundle, and vapor-liquid separating means arranged to receive a vapor-liquid mixture from said vapor-liquid collection chamber, said separator arranged to discharge separated liquid to said body of liquid and vapor to said vapor space.

10. A vapor generating unit comprising wall means forming a vertically elongated pressure vessel of circular cross section arranged to operate with an upper vapor space above a body of liquid therein, a vapor outlet from said vapor space, plates means coacting with said pressure vessel wall means to form an interior vertically elongated vapor generation chamber and an annular shaped downcomer passage exterior of said chamber within the lower portion of said vessel, said plate means extending downwardly to substantially the bottom of said vapor generation chamber, said downcomer arranged for the downward flow of liquid from said body of liquid to supply said vapor generation chamber, said vapor generation chamber including a vapor-liquid collection chamber disposed at its uppermost portion above the tube bundle, a plurality of tubes constituting a vertically elongated bundle arranged to substantially fill said vapor generation chamber, said tubes being U-shaped and having the bends at the uppermost end of the bundle, means for passing a heating fluid through the tubes of said bundle, a plurality of vapor-liquid outlets in said plate means for the discharge of a vapor-liquid mixture outward from said vapor-liquid collection chamber, a ring of vertically elongated whirl chamber type vapor-liquid separators each arranged to receive a vapor-liquid mixture from one of said vapor-liquid outlets, said separators each arranged to discharge separated vapor to said vapor space and separated liquid to said downcomer and further arranged with said normal liquid level positioned at the upper one third of the height of each separator, and said separators each having a liquid discharge portion arranged to direct liquid into the annular downcomer below the top of and exterially of the tube bundle.

11. A vapor generating unit comprising wall means forming a vertically elongated pressure vessel of circular cross section arranged to operate with an upper vapor space above a body of liquid therein, a vapor outlet from said vapor space, plate means coacting with said pressure vessel wall means to form an interior vertically elongated vapor generation chamber and an annular shaped downcomer passage exterior of said chamber within the lower portion of said vessel, said plate means extending downwardly to substantially the bottom of said vapor generation chamber, said downcomer arranged for the downward flow of liquid from said body of liquid to supply said vapor generation chamber, said vapor generation chamber including a vapor-liquid collection chamber disposed at its uppermost portion above the tube bundle along the longitudinal axis of said vessel and extending into said vapor space, a plurality of tubes constituting a vertically elongated bundle arranged to substantially fill said vapor generation chamber, said tubes being U-shaped and having the bends at the uppermost end of the bundle, means for passing a heating fluid through the tubes of said bundle, a plurality of vapor-liquid outlets in said plate means for the discharge of a vapor-liquid mixture outward from said vapor-liquid collection chamber, a ring of vertically elongated whirl chamber type vapor-liquid separators each arranged to receive a vapor-liquid mixture from one of said vapor-liquid outlets, said separators each arranged to discharge separated vapor to said vapor space and separated liquid to said downcomer and further arranged with said normal liquid level positioned at the upper one third of the height of each separator, said separators each having a liquid discharge portion arranged to direct liquid into the annular downcomer below the top of an exterially of the tube bundle, a feed liquid inlet means arranged to discharge feed liquid along the longitudinal axis of said vessel within said vapor-liquid collection chamber, and corrugated vapor scrubbing elements arranged between the outlets of said separators and said vapor outlet.

12. A vapor generating unit comprising wall means forming a vertically elongated pressure vessel of circular cross section arranged to operate with an upper vapor space above a body of liquid therein, a vapor outlet from said vapor space, plate means coacting with said pressure vessel wall means to form an interior vertically elongated vapor generation chamber and an annular shaped downcomer passage exterior of said chamber within the lower portion of said vessel, said plate means extending downwardly to substantially the bottom of said vapor generation chamber, said downcomer arranged for the downward flow of liquid from said body of liquid to supply said vapor generation chamber, said vapor generation chamber including a vapor-liquid collection chamber disposed at its uppermost portion above the tube bundle, a plurality of tubes constituting a vertically elongated bundle arranged to substantially fill said vapor generation chamber said tubes being U-shaped and having the bends at the uppermost end of the bundle, means for passing a heating fluid through the tubes of said bundle including a tube sheet having a multiplicity of tube seats arranged to receive and hold the tube ends of said U-shaped tubes, means enclosing one face of said tube sheet to provide adjacent but separate heating fluid inlet and outlet chambers, said tube sheet being flat and arranged transversely of the longitudinal axis of the pressure vessel to form the lower end of the steam generation chamber and vapor-liquid separating means arranged to receive a vapor-liquid mixture from said vapor-liquid collection chamber said separator arranged to discharge separated liquid to said body of liquid and vapor to said vapor space.

13. A vapor generating unit comprising wall means forming a vertically elongated pressure vessel of circular cross section arranged to operate with an upper vapor space above a body of liquid therein, a vapor outlet from said vapor space, plate means coacting with said pressure vessel wall means to form an interior vertically elongated vapor generation chamber and an annular shaped downcomer passage exterior of said chamber within the lower portion of said vessel, said plate means extending downwardly to substantially the bottom of said vapor generation chamber, said downcomer arranged for the downward flow of liquid from said body of liquid to supply said vapor generation chamber, said vapor generation chamber including a vapor-liquid collection chamber disposed at its uppermost portion above the tube bundle, a plurality of tubes constituting a vertically elongated bundle arranged to subsbtantially fill said vapor generation chamber said tubes being U-shaped and having the bends at the uppermost end of the bundle, means for passing a heating fluid through the tubes of said bundle including a tube sheet having a multiplicity of tube seats arranged to receive and hold the tube ends of said U-shaped tubes, means enclosing one face of said tube sheet to provide adjacent but separate heating fluid inlet and outlet chambers, said tube sheet being formed as a hemisphere with radially arranged tube seats, and vapor-liquid separating means arranged to receive a vapor-liquid mixture from said vapor-liquid collection chamber said separator arranged to discharge separated liquid to said body of liquid and vapor to said vapor space.

14. A vapor generating unit comprising wall means forming a vertically elongated pressure vessel of circular cross section arranged to operate with an upper vapor space above a body of liquid therein, a vapor outlet from said vapor space, plate means coacting with said pressure vessel walls means to form an interior vertically elongated vapor generation chamber and an annular shaped downcomer passage exterior of said chamber within the lower portion of said vessel, said plate means extending downwardly to substantially the bottom of said vapor generation chamber, said downcomer arranged for the downward flow of liquid from said body of liquid to supply said vapor generation chamber, said vapor-generation chamber including a vapor-liquid collection chamber disposed at its uppermost portion above the tube bundle, a plurality of tubes constituting a vertically elongated bundle arranged to subsbtantially fill said vapor generation chamber said tubes being U-shaped and having the bends at the uppermost end of the bundle, means for passing a heating fluid through the tubes of said bundle including a tube sheet having a multiplicity of tube seats arranged to receive and hold the tube ends of said U-shaped tubes, means enclosing one face of said tube sheet to provide adjacent but separate heating fluid inlet and outlet chambers, said tube sheet being flat and arranged transversely of the longitudinal axis of the pressure vessel to form the lower end of the steam generation chamber, a plurality of vapor-liquid outlets in said plate means for the discharge of a vapor-liquid mixture outward from said vapor-liquid collection chamber, a ring of vertically elongated whirl chamber type vapor-liquid separators each aranged to receive a vapor-liquid mixture from one of said vapor-liquid outlets, said separators each arranged to discharge separated vapor to said vapor space and separated liquid to said downcomer and further arranged with said normal liquid level positioned at the upper one third of the height of each separator, said separators each having a liquid discharge portion arranged to direct liquid into the annular downcomer below the top of and exterially of the tube bundle and a feed liquid inlet means arranged to discharge feed liquid along the longitudinal axis of said vessel within said vapor-liquid collection chamber.

15. A vapor generating unit comprising: wall means forming a vertically elongated pressure vessel of circular cross section arranged to operate with an upper vapor space above a body of liquid therein, a vapor outlet from said vapor space, plate means coacting with said pressure vessel wall means to form an interior vertically elongated vapor generation chamber and an annular shaped downcomer passage exterior of said chamber within the lower portion of said vessel, said plate means extending downwardly to substantially the bottom of said vapor generation chamber, said downcomer arranged for the downward flow of liquid from said body of liquid to supply said vapor generation chamber, said vapor-generation chamber including a vapor-liquid collection chamber disposed at its uppermost portion above the tube bundle, a plurality of tubes constituting a vertically elongated bundle arranged to substantially fill said vapor generation chamber said tubes being U-shaped and having the bends at the uppermost end of the bundle, means for passing a heating fluid through the tubes of said bundle including a tube sheet having a multiplicity of tube seats arranged to receive and hold the tube ends of said U-shaped tubes, means enclosing one face of said tube sheet to provide adjacent but separate heating fluid inlet and outlet chambers, said tube sheet being formed as a hemisphere with radially arranged tube seats, a plurality of vapor-liquid outlets in said plate means for the discharge of a vapor-liquid mixture outward from said vapor-liquid collection chamber, a ring of vertically elongated whirl chamber type vapor-liquid separators each arranged to receive a vapor-liquid mixture from one of said vapor-liquid outlets, said separators each arranged to discharge separated vapor to said vapor space and separated liquid to said downcomer and further arranged with said normal liquid level positioned at the upper one third of the height of each separator, said separators each having a liquid discharge portion arranged to direct liquid into the annular downcomer below the top of and exterially of the tube bundle and a feed liquid inlet means arranged to discharge feed liquid along the longitudinal axis of said vessel within said vapor-liquid collection chamber.

16. In combination, a vertically arranged pressure vessel of circular cross section arranged to operate with an upper vapor space above a body of liquid therein, a vapor outlet from said vapor space, plate means coacting with said pressure vessel walls to form an interior vapor-liquid collection chamber centrally arranged along the upright axis of said vessel and an annular shaped space within said vessel, a plurality of vapor-liquid outlets in said plate means for the discharge of a vapor-liquid mixture from said vapor-liquid collection chamber, and vapor-liquid separating means arranged to receive a vapor-liquid mixture from said vapor-liquid collection chamber said separating means arranged to discharge separated liquid to said body of liquid and vapor to said vapor space, said plate means extending downwardly below the level of said liquid to substantially the bottom of the interior of said vessel to provide for the downward flow of separated liquid in said annular space and the upward flow of a vapor-liquid mixture in said vapor-liquid collection chamber.

17. In combination, a vertically arranged pressure vessel of circular cross section arranged to operate with an upper vapor space above a body of liquid therein, a vapor outlet from said vapor space, plate means coacting with said pressure vessel walls to form an interior vapor-liquid collection chamber centrally arranged along the upright axis of said vessel and an annular shaped space within said vessel, a plurality of vapor-liquid outlets in said plate means for the discharge of a vapor-liquid mixture from said vapor-liquid collection chamber, and a ring of vertically elongated whirl chamber type vapor-liquid separators each arranged to receive a vapor-liquid mixture from one of said vapor-liquid outlets, said separating means arranged to discharge separated liquid to said body of liquid and vapor to said vapor space, said plate means extending downwardly below the level of said liquid to substantially the bottom of the interior of said vessel to provide for the downward flow of separated liquid in said annular space and the upward flow of a vapor-liquid mixture in said vapor-liquid collection chamber.

18. In combination, a vertically arranged pressure vessel of circular cross section arranged to operate with an upper vapor space above a body of liquid therein, a vapor outlet from said vapor space, plate means coacting with said pressure vessel walls to form an interior vapor-liquid collection chamber centrally arranged along the upright axis of said vessel and an annular shaped space within said vessel, a plurality of vapor-liquid outlets in said plate means for the discharge of a vapor-liquid mixture from said vapor-liquid collection chamber, a ring of vertically elongated whirl chamber type vapor-liquid separators each arranged to receive a vapor-liquid mixture from one of said vapor-liquid outlets, and corrugated steam scrubbing elements arranged between the outlets of said separators and said vapor outlet said separating means arranged to discharge separated liquid to said body of liquid and vapor to said vapor space, said plate means extending downwardly below the level of said liquid to substantially the bottom of the interior of said vessel to provide for the downward flow of separated liquid in said annular space and then upward flow of a vapor-liquid mixture in said vapor-liquid collection chamber.

References Cited in the file of this patent

UNITED STATES PATENTS

| 1,416,995 | Stroud | May 23, 1922 |

FOREIGN PATENTS

| 1,034,251 | France | Apr. 8, 1953 |
| 690,993 | Great Britain | May 6, 1953 |